J. P. RING & E. L. MOONEY.
Combined Harrow and Roller.

No. 225,024.  Patented Mar. 2, 1880.

UNITED STATES PATENT OFFICE.

JOHN P. RING AND EDWARD L. MOONEY, OF MOUNT MORRIS, ILLINOIS.

COMBINED HARROW AND ROLLER.

SPECIFICATION forming part of Letters Patent No. 225,024, dated March 2, 1880.

Application filed December 31, 1879.

*To all whom it may concern:*

Be it known that we, JOHN P. RING and EDWARD L. MOONEY, of Mount Morris, in the county of Ogle and State of Illinois, have invented certain new and useful Improvements in Combined Harrow and Roller; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to furnish an improved combined harrow and field-roller which will be simple in structure and cheap in its manufacture.

We will first describe our invention, and will then specifically point it out in the claim.

Figure 1:
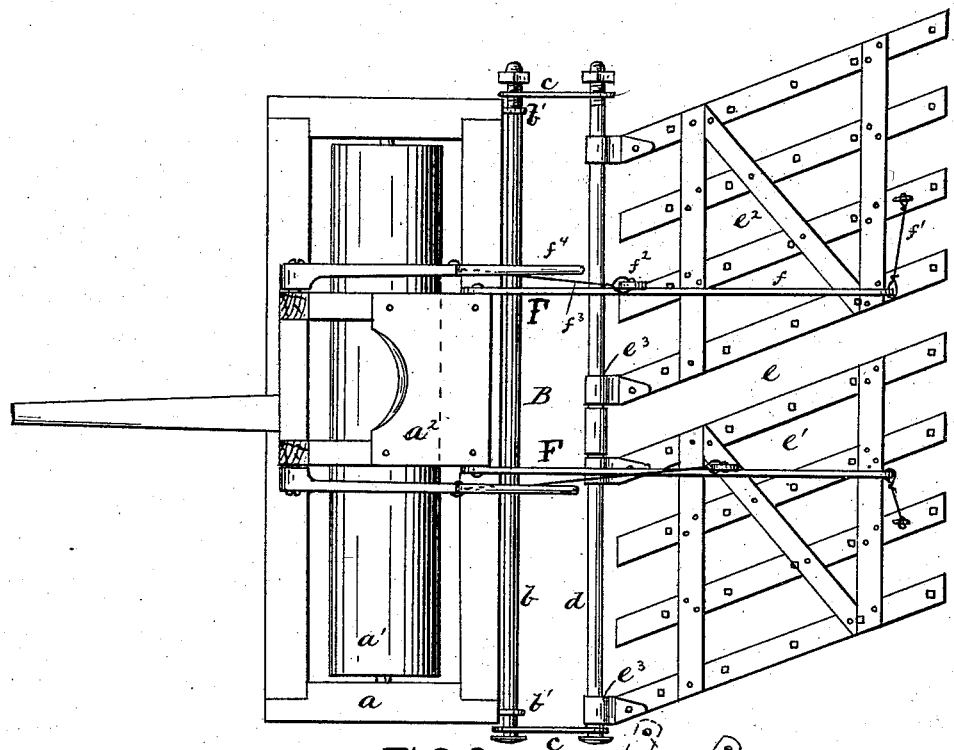
Figure 2:
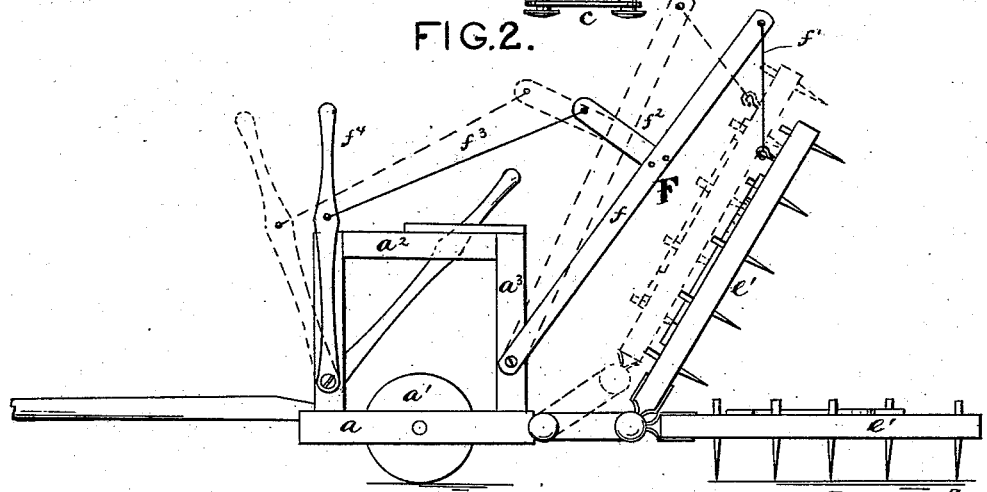

In the drawings, Figure 1 is a plan, and Fig. 2 is a side elevation, of a combined harrow and roller made in accordance with our invention.

$a$ is the frame, in which is journaled the roller $a'$ and on which is placed the driver's seat $a^2$. On the rear side of the frame $a$ we place the rod $b$, held in rings or staples $b'$, so that it will turn freely. The rod $b$ extends the whole length of the frame $a$, as shown.

$c\ c$ are coupling-links fixed on and near the ends of the rod $b$. In the outer ends of these coupling-links suitable bearings are provided, in which are placed the ends of the bar $d$, as shown.

The bar $b$, links $c\ c$, and bar $d$ form a connecting-frame, B, between the frame of the roller and the harrow. The links $c\ c$ are attached to the bars $b$ and $d$ by loose bearings, so that the rod $d$ may have one end elevated several inches, while its opposite end will rest on the ground.

$e$ is the harrow, made in the two sections $e'$ $e^2$, as shown. The sections are attached to the bar $d$ by the bearings or sleeves $e^3\ e^3$, so that they can be raised, as shown in Fig. 2.

F is an inverted-T-shaped lever, composed of the horizontal bar $f$ and the central vertical bar, $f^2$. The forward end of the bar $f$ is pivoted to the upright $a^3$ of the roller-frame, while its rear or swinging end is extended back until it stands nearly over the rear end of the harrow, and is connected to the harrow by the vertical rod or coupling $f'$. The central vertical bar or standard, $f^2$, is made of such height that its upper end will be very nearly in the same horizontal plane with the point on the lever $f^4$ at which the rod $f^3$, which connects its upper end with the said operating-lever $f^4$, is attached.

When the harrow is made in sections, as described, we provide operating arms and levers for each section, as shown in the drawings.

In the operation of the device the frame B permits a free movement of the sections of the harrow in the adjustment of the latter to any uneven surface of the ground.

The arm $f$, constructed as described, will, in the first part of its movement, raise the section of the harrow to which it is attached, without in the slightest degree affecting the position of the bar $d$ on the other section of the harrow. When the section has been raised to an angle of about forty-five degrees the arm will then give it a quick and rapid vertical lift, which will at the same time cause the bar $d$ to assume an inclined position, which will slightly raise the side or end of the other section. This enables the harrow to be easily lifted over small or large obstacles, or elevated for the purpose of removal to other places.

The harrow may be thrown up behind the seat. The frame B permits the hinged end of the harrow to be raised entirely above the bar $b$.

Having thus described our invention, what we claim, and desire to secure by Letters Patent, is—

In a combined harrow and roller, the combination, with the roller-frame $a$ and harrows $e'\ e^2$, having sleeve attachments $e^3$, of the intermediate frame, B, composed of the bars $b\ d$ and links $c\ c$, loosely connected to the ends of the said bars $b\ d$, the operating-levers $f^4$ and T-lever F, and connecting-rods $f'\ f^3$, all arranged to operate substantially as and for the purposes set forth.

In testimony that we claim the foregoing we have hereunto set our hands this 6th day of December, 1879.

JOHN P. RING.
ED. L. MOONEY.

Witnesses:
A. W. BRAYTON,
F. F. KNODLE.